United States Patent [19]
Popat et al.

[11] Patent Number: 5,262,216
[45] Date of Patent: Nov. 16, 1993

[54] PRESSURE SENSITIVE LABEL ASSEMBLY

[75] Inventors: Ghanshyam H. Popat, Alta Loma; Thomas Mammen, LaVerne, both of Calif.

[73] Assignee: Avery Dennison Corporation, Pasadena, Calif.

[21] Appl. No.: 925,093

[22] Filed: Aug. 4, 1992

[51] Int. Cl.$^5$ .............. A61F 13/02; E04F 15/16; B32B 7/12; B32B 15/04
[52] U.S. Cl. .................... 428/42; 428/40; 428/41; 428/352; 428/354; 428/355; 525/240
[58] Field of Search ............. 428/42, 41, 40, 352, 428/354, 355; 525/240

[56] References Cited

U.S. PATENT DOCUMENTS

| | | | |
|---|---|---|---|
| 4,425,176 | 1/1984 | Shibano et al. | 156/344 |
| 4,543,099 | 9/1985 | Bunnelle et al. | 428/152 |
| 4,584,219 | 4/1986 | Baartmans | 428/42 |
| 4,585,254 | 4/1986 | Adams | 428/42 |
| 4,593,913 | 6/1986 | Kochevar | 273/420 |
| 4,693,772 | 9/1987 | Douglas | 264/54 |
| 4,696,843 | 9/1987 | Schmidt | 428/40 |
| 4,768,810 | 9/1988 | Mertens | 428/202 |
| 4,812,363 | 3/1989 | Bell et al. | 428/420 |
| 4,929,509 | 5/1990 | Godfrey | 428/461 |
| 4,937,138 | 6/1990 | Mostert | 525/240 |
| 5,013,785 | 5/1991 | Mizui | 525/240 |
| 5,106,446 | 4/1992 | Beck et al. | 156/331 |

*Primary Examiner*—George F. Lesmes
*Assistant Examiner*—Kathryne E. Shelborne
*Attorney, Agent, or Firm*—Poms, Smith, Lande & Rose

[57] ABSTRACT

A pressure sensitive label assembly includes labels mounted on a backing sheet with the labels having a pressure sensitive adhesive which includes between 45 wt. and 85 wt. % of a copolymer of propylene or ethylene with an aliphatic hydrocarbon having an open chain configuration with between 5 and 7, preferably 6, carbon atoms. The copolymer is preferably amorphous propylene-hexene. The pressure sensitive adhesive also includes liquid and solid tackifiers, and may include U.V. stabilizing and anti-oxidant material.

21 Claims, 1 Drawing Sheet

PRESSURE SENSITIVE LABEL ASSEMBLY

FIELD OF THE INVENTION

This invention relates to pressure sensitive adhesive label assemblies using a special adhesive composition.

BACKGROUND OF THE INVENTION

Labels using pressure sensitive adhesives are well known. In general, pressure sensitive labels involve the label itself, a pressure sensitive adhesive, and a backing sheet upon which the label or labels are mounted. The backing sheet is usually coated with a release coating such as a silicone so that the adhesive coated labels may be more easily removed. Various types of adhesives may be used to coat the labels. For example, the adhesives may be permanent or removable. The nature of the adhesive, whether permanent or removable, is often specified by the force required to peel (peel force) a one-inch wide sample strip at right angles from a stainless steel surface to which it has been adhered. The designation "permanent adhesive" is normally applied to adhesives having a peel force in the order of 3 pounds or more, while pressure sensitive adhesives having a peel force of less than about two pounds are normally referred to as removable adhesive coatings.

Most modern pressure-sensitive adhesives are applied to the substrate or label stock by one of three techniques: (1) coating from an organic solvent based solution, (2) coating from a suspension or dispersion such as an aqueous latex, or (3) coating or extruding a hot melt pressure-sensitive composition.

Reference is made to U.S. Pat. No. 4,543,099, granted Sep. 24, 1985, and to U.S. Pat. No. 4,693,772, granted Sep. 15, 1987, as disclosing prior art relating to pressure sensitive adhesives and to a sealant, respectively.

Hot melt adhesives have certain significant advantages over adhesives applied in other ways, and for adhesives where it is desirable to have resistance to ultraviolet light and to plasticizers (which may soften or degrade the adhesive), hot melt adhesives using acrylic material are often used. However, acrylic hot melt adhesives are moderately expensive.

Accordingly, an important object of the invention is to provide a high quality, pressure sensitive adhesive which is less expensive than known pressure sensitive, high quality adhesives.

SUMMARY OF THE INVENTION

The foregoing object and others are accomplished by the present invention by providing a pressure sensitive adhesive label assembly which includes a normal label, a backing sheet on which the label or labels are mounted, and a pressure sensitive adhesive. The pressure sensitive adhesive has at least about 45 wt. % of a copolymer consisting essentially of (1) an olefinic hydrocarbon of from 2 to 3 carbon atoms and (2) an open chain aliphatic hydrocarbon having from 5 to 7 carbon atoms.

Exemplary copolymers of the present invention include copolymers of ethylene and/or propylene with pentene, heptene, hexene, etc., with amorphous propylene-hexene being preferred.

Generally speaking, the weight percentage, in the copolymer, of the olefinic hydrocarbon having 2 to 3 carbon atoms, will vary from about 25 wt. % to 75 wt. %, the preferred amount being from about 30 wt. % to about 60 wt. % and a more preferred amount being from about 40 wt. % or 45 wt. % to about 50 wt. % or 55 wt. %.

The weight percent in the copolymer of the open chain aliphatic hydrocarbon will vary from about 75 wt. % to about 25 wt. %, the preferred amount being from about 70 wt. % to about 40 wt. % and a more preferred amount being from about 60 wt. % or 55 wt. % to about 45 wt. % or 50 wt. %.

The pressure sensitive adhesive, in addition to containing said copolymer, will also include at least one tackifier, and may include other usual additives, such as anti-oxidants, U.V. absorbers and stabilizers, etc., the tackifier usually being present in an amount of from about 10 wt. % to about 60 wt. %.

The percentages of the various materials may vary, but for one type of hot melt adhesive, preferred ranges of weight percentages for the materials would be as follows:

| | |
|---|---|
| Copolymer | 45%–85% |
| Solid Tackifier | 5%–35% |
| Liquid Tackifier | 4%–24% |
| Anti-Oxidant | 0.1%–2% |
| U.V. Absorber and Stabilizer | 0.05%–1% |

For permanent pressure sensitive adhesives, higher amounts of the copolymer and the solid tackifier would be used, while for removable pressure sensitive adhesives, lower percentages of the copolymer and solid tackifier would be used, with higher percentages of the liquid tackifier.

The hot melt adhesive is applied at a temperature above the melting point of the adhesive, normally at a temperature of between about 50° F. to 150° F. above the melting point of the adhesive, with about 350° F. being preferred for the preferred composition.

The preferred copolymer contains about 53 wt. % of open chain aliphatic hydrocarbon and 47 wt. % of olefinic hydrocarbon of from 3 to 4 carbon atoms. The preferred open chain aliphatic hydrocarbon is hexene or, even more preferably, hexene, e.g., 1-hexene or 2-hexene, and the preferred olefinic hydrocarbon is propylene.

The molecular weight of the copolymer may vary greatly, but generally should be a solid at ambient temperature and flow readily at less than 500° F. The particular molecular weight of the copolymer is between about 20,000 to 200,000, with the preferred molecular weight being between about 30,000 or 40,000 to about 70,000 or 80,000.

Instead of hot melt application, the adhesive could also be applied at room temperatures, using solvents such as toluene, methyl ethyl ketone (MEK), ethyl acetate, heptane, or other solvents. The basic composition would be as set forth above, but 30% to 50% of solvent would be employed.

Concerning the propylene-hexene copolymer, it preferably has a molecular weight in the range of 40,000 to 70,000. It has a specific gravity of about 0.086±0.010. Its melting point is about 125° C. or 257° F. It is a clear, tan tinted, pale colored tacky solid. Pressure sensitive adhesives, in accordance with the formulation described above, have a peel force of about 2.5 to 5.0 lbs. for a one-inch strip pulled off stainless steel at 180 degrees, or parallel to the stainless steel sheet.

The resultant pressure sensitive adhesive has good resistance to ultraviolet light and plasticizers, and is also substantially less costly than comparable acrylic adhesives.

Other objects, features and advantages of the invention will be apparent from a consideration of the following detailed description and from the accompanying drawings.

Figure 1:
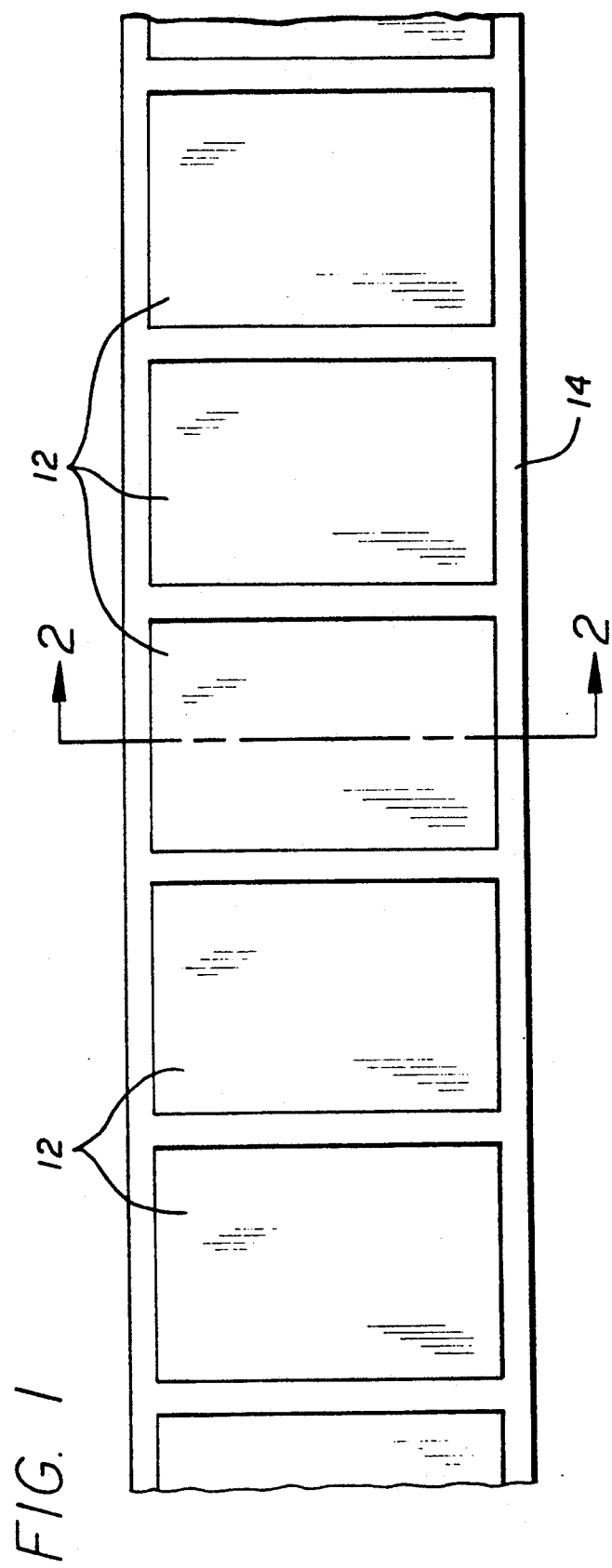
FIG. 1 is a top view of a label assembly including a series of labels 12 mounted on a backing strip 14. As shown in the cross-sectional view of FIG. 2, the labels 12 have a coating of pressure sensitive adhesive 16 on the lower surface thereof facing the backing strip 14. The backing sheet preferably has a very light coating of a release layer, such as silicone, to prevent firm adherence of the labels to the backing strip, and to permit the labels to be readily applied to a product. The labels and backing sheet are of conventional, known flexible sheet materials.
Figure 2:
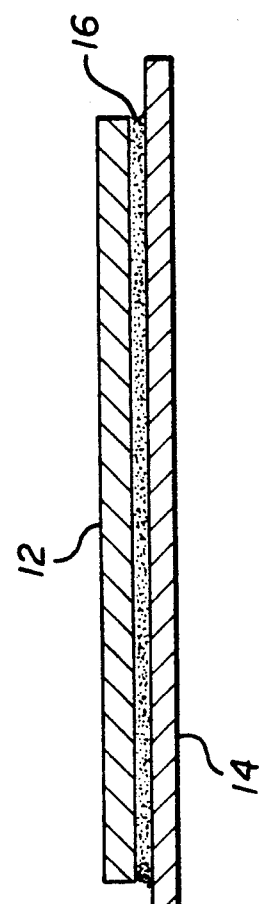

One preferred composition for the pressure sensitive adhesive is as follows:

|  | Weight Percentages |
| --- | --- |
| Propylene-hexene copolymer | 64.0% |
| Solid Tackifier | 20.0% |
| Liquid Tackifier | 15.0% |
| Anti-Oxidant (A) | 0.5% |
| Anti-Oxidant (B) | 0.1% |
| U.V. Absorber | 0.2% |
| U.V. Stabilizer | 0.2% |

Concerning the particular materials which are used, the properties of the amorphous propylene-hexene copolymer have been described hereinabove, and it is available from Eastman Chemical Co. as APH D-161. The solid tackifier is a hydrogenated styrene-type resin available as Regalrez 1094 from Hercules Incorporated; and the liquid tackifier is a hydrogenated aromatic hydrocarbon resin available as Regalrez 1018 from Hercules Incorporated. The anti-oxidant (A) is available as Irganox 1010 from Ciba-Geigy Corporation, and the anti-oxidant (B) is available as Weston 618F from General Electric Co. The U.V. absorber is available as Tinuvin 328, and the U.V. stabilizer as Tinuvin 622 LD, both from Ciba-Geigy Corporation.

Using the foregoing compositions, the melt viscosity at 350° F. is about 8,000 cps to 13,000 cps, and the peel force is as mentioned hereinabove.

As mentioned above, although propylene-hexene is preferred, propylene-hexane may also be used, with only slightly different pressure sensitive adhesive properties. Accordingly, either type of open chain aliphatic hydrocarbons having six carbon atoms, may be employed.

It is further noted that satisfactory results have also been obtained using ethylene instead of propylene. Accordingly, it is contemplated that olefins forming copolymers with hexane or hexene could be employed in the implementation of the present invention, preferably with relative high molecular weights, so that the material is a solid of the general type described above for propylene hexene.

Other types of liquid and solid tackifiers could be used, including hydrogenated resins of the Escorez 5300 series from Exxon (solid tackifier), and hydrocarbon resins such as Eastotack from Eastman Chemical, and Wingtack from Goodyear (liquid tackifiers). Concerning the U.V. absorber and stabilizer, these could be omitted in applications where U.V. light is not a problem, and similarly, for some applications, anti-oxidants are not needed.

In conclusion, in the foregoing detailed description and drawings, preferred illustrative embodiments of the invention have been described. It is to be understood, however, that the present invention is not limited to the exact formulations and constructions described hereinabove, but that the present invention is applicable to other types of label constructions, including multi-layer and locally coated adhesive labels, and that moderate variations in the formulations could be used. Thus, by way of example but not of limitation, it has been noted that hexane and hexene, which are both open chain aliphatic hydrocarbons having six carbon atoms, are preferably employed; and similar chains of hydrocarbons having 5 or 7 carbon atoms could also be included in copolymers with propylene or ethylene to form pressure sensitive adhesives with adequate properties. Accordingly, the present invention is not limited to the precise arrangements shown in the drawings and described hereinabove.

We claim:

1. A label assembly comprising:
   a backing sheet having a release coating thereon;
   a plurality of labels mounted on said backing sheet;
   said labels being coated with a pressure sensitive adhesive; and
   said pressure sensitive adhesive being formed of between about 45 wt. % and 85 wt. % of a propylene-hexene copolymer, said copolymer being formed of between about 40 wt. % and 70 wt. % hexene and between about 60 wt. % and 30 wt. % propylene.

2. A label assembly as defined in claim 1 wherein said pressure sensitive adhesive includes at least 10% tackifiers.

3. A label assembly as defined in claim 1 wherein said label assembly includes at least 5 wt. % of a solid tackifier, and at least 4 wt. % of a liquid tackifier.

4. A label assembly as defined in claim 1 wherein said propylene-hexene copolymer is formed of between 45 wt. % and 60 wt. % hexene and between 55 wt. % and 40 wt. % propylene.

5. A label assembly as defined in claim 1, wherein said propylene-hexene copolymer is formed of 53 wt. % hexene and 47 wt. % propylene.

6. A label assembly comprising:
   a backing sheet having a release coating thereon;
   a plurality of labels mounted on said backing sheet;
   said labels being coated with a pressure sensitive adhesive; and
   said pressure sensitive adhesive being formed of between about 45 wt. % and 85 wt. % of a copolymer of:
   (1) between about 60 wt. % and 30 wt. % of a hydrocarbon selected from the group consisting of polypropylene and polyethylene, and
   (2) between about 40 wt. % and 70 wt. % of an open chain aliphatic hydrocarbon having from 5 to 7 carbon atoms.

7. A label assembly as defined in claim 6 wherein said pressure sensitive adhesive includes at least 10 wt. % tackifiers.

8. A label assembly as defined in claim 6 wherein said label assembly includes at least 5 wt. % of a solid tackifier, and at least 4 wt. % of a liquid tackifier.

9. A label assembly as defined in claim 6 wherein said open chain aliphatic hydrocarbon is hexene.

10. A label assembly as defined in claim 6 wherein said hydrocarbon is propylene.

11. A label assembly as defined in claim 6 wherein said copolymer is formed of between about 55 wt. % and 40 wt. % of said hydrocarbon and between about 45 wt. % and 60 wt. % of said open chain aliphatic hydrocarbon.

12. A label assembly as defined in claim 6 wherein said pressure sensitive material includes between 45 wt. % and 85 wt. % of amorphous propylene hexene copolymer, said polymer being formed of between about 60 wt. % and 30 wt. % propylene and between about 40 wt. % and 70 wt. % hexene, between 9 wt. % and 59 wt. % of tackifier material, and less than 3 wt. % of antioxidant material and less than 2 wt. % ultraviolet light stabilizer material.

13. A label assembly comprising:
a backing sheet having a release coating thereon;
a plurality of labels mounted on said backing sheet said labels being coated with a pressure sensitive adhesive; and
said pressure sensitive adhesive being formed principally of a copolymer of:
(1) between about 60 wt. % and 30 wt. % of an olefinic hydrocarbon of from 2 to 3 carbon atoms, and
(2) between about 40 wt. % and 70 wt. % of an open chain aliphatic hydrocarbon having 5 to 7 carbon atoms.

14. A label assembly as defined in claim 13 wherein said pressure sensitive adhesive includes at least 20 wt. % tackifiers.

15. A label assembly as defined in claim 13 wherein said label assembly includes at least 5 wt. % of a solid tackifier, and at least 4 wt. % of a liquid tackifier.

16. A label assembly as defined in claim 13 wherein said pressure sensitive adhesive includes at least 20 wt. % tackifiers.

17. A label assembly as defined in claim 13 wherein said open chain aliphatic hydrocarbon is hexene.

18. A label assembly as defined in claim 13 wherein said pressure sensitive material includes between 45 wt. % and 85 wt. % of said copolymer.

19. A label assembly as defined in claim 13 wherein said pressure sensitive material includes between 45 wt. % and 85 wt. % of amorphous propylene hexene copolymer, said copolymer being formed of between about 60 wt. % and 30 wt. % propylene and between about 40 wt. % and 70 wt. % hexene, between 9 wt. % and 59 wt. % of tackifier material, and less than 3 wt. % of antioxidant material and less than 2 wt. % of ultraviolet light stabilizer material.

20. A label assembly as defined in claim 13 wherein said olefinic hydrocarbon is propylene.

21. A label assembly as defined in claim 13 wherein said open chain aliphatic hydrocarbon has 6 carbon atoms.

* * * * *